(12) United States Patent
Coniglio

(10) Patent No.: US 12,382,939 B1
(45) Date of Patent: Aug. 12, 2025

(54) FISHING LURE

(71) Applicant: George J. Coniglio, Mission Viejo, CA (US)

(72) Inventor: George J. Coniglio, Mission Viejo, CA (US)

( * ) Notice: Subject to any disclaimer, the term of this patent is extended or adjusted under 35 U.S.C. 154(b) by 0 days.

(21) Appl. No.: 18/629,472

(22) Filed: Apr. 8, 2024

(51) Int. Cl.
*A01K 85/18* (2006.01)
*A01K 85/00* (2006.01)

(52) U.S. Cl.
CPC .......... *A01K 85/18* (2013.01); *A01K 85/1821* (2022.02)

(58) Field of Classification Search
CPC . A01K 85/18; A01K 85/1821; A01K 85/1811
See application file for complete search history.

(56) References Cited

U.S. PATENT DOCUMENTS

| | | | |
|---|---|---|---|
| 12,213,470 B1 * | 2/2025 | Major | A01K 85/01 |
| 2003/0093940 A1 * | 5/2003 | Walker | A01K 85/00 |
| | | | 43/42.25 |
| 2003/0192227 A1 * | 10/2003 | Stava, III | A01K 85/00 |
| | | | 43/42.24 |
| 2019/0116770 A1 * | 4/2019 | Thompson | A01K 85/18 |
| 2019/0133099 A1 * | 5/2019 | Ostruszka | A01K 85/14 |
| 2022/0304293 A1 * | 9/2022 | Reed | A01K 85/10 |

FOREIGN PATENT DOCUMENTS

| | | | | |
|---|---|---|---|---|
| AU | 2023201173 B1 | * | 11/2023 | A01K 85/00 |
| KR | 20000035612 A | * | 6/2000 | |

* cited by examiner

*Primary Examiner* — Christopher P Ellis
(74) *Attorney, Agent, or Firm* — Crockett & Crockett, PC; K. David Crockett, Esq.; Niky Economy Syrengelas, Esq.

(57) ABSTRACT

An artificial fishing lure that includes an elongate body that has a curling tail extending from an end of the elongate body. The curling tail may curl upward or downward. The lure also includes a feather placed on a predetermined position of the curling tail. The feather placement creates realistic looking optical side to side and back and forth swimming motion so that the lure appears more like a real fish moving through the water.

16 Claims, 5 Drawing Sheets

FISHING LURE

FIELD OF THE INVENTIONS

The inventions described below relate to the field of fishing lures and more specifically to realistic fishing lures that appear similar to live baitfish when trailing through the water.

BACKGROUND OF THE INVENTIONS

A fishing lure is a type of artificial fishing bait that is intended to attract a fish's attention. Fish are naturally attracted to the live bait, but the lure is a substitute used by fisherman to catch fish. The fisherman controls and manipulates movement of the lure to attract the fish. The fishing lure is tied to the fishing line, which is connected to a fishing reel and rod. Fishermen reel in the fishing line, sweep the fishing rod, or let out line to manipulate the motion of the lure. The desire to effectively attract fish requires use of realistic lures that attract the fish. The problem with conventional swim baits is that they do not reproduce the action of a natural baitfish. Many conventional swim bait lures do not contain the proper grub or twister tail that disturbs the water in a specific zone along the top arching ridge of the curling tail to reproduce the correct side to side, back and for the motion of the trailing feature to replicate a swimming fish's tail beating. Consequently, there is a need for a single lure body that includes a fish tail feature that more effectively attract fish.

SUMMARY

The devices and methods described below provide for an artificial lure with a natural profile that realistically simulates the back-and-forth motion of a fish tail when the lure is advanced through the water.

The lure includes an elongate body and a curling tail extending from an end of the elongate body. The curling tail attaches to the elongate body but is shorter than the elongate body. The curling tail may curl upward or downward. The lure also includes a feather placed on a predetermined position of the elongate body in relation to the curling tail to extend or trail over the curling tail. The feather placement creates realistic looking optical side to side and back and forth swimming motion so that the lure appears more like a real fish moving through the water. Positioning other than within the predetermined range means that the feather does not move back and forth so that it merely flutters and undulates in a straight back (or trailing) orientation. Alternatively, if not positioned correctly, the feature spirals and corkscrews and can become entangled with the curling tail and merely ripples back and forth with very little side to side motion. When the feather is placed too high above the curling tail feather flutters and ripples straight back without producing realistic side to side motion.

DETAILED DESCRIPTION OF THE INVENTIONS

Figure 1:
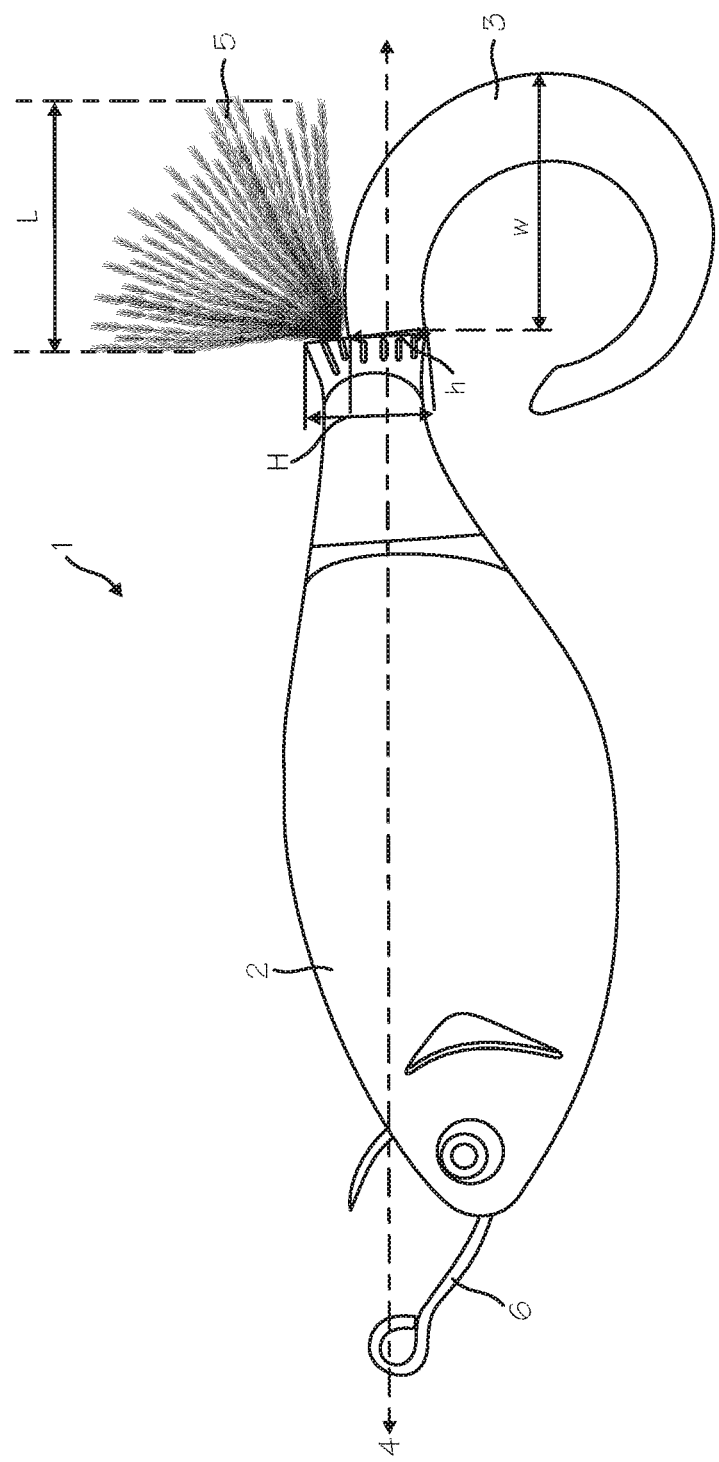
FIG. 1 illustrates an artificial fishing lure with a downward curling tail having a feather placed on a first position of the elongate body.

FIG. 1 is an artificial fishing lure 1 illustrates an artificial fishing lure with a downward curling tail having a feather placed on a first position of the elongate body. The fishing lure includes an elongate body 2 having a first end and a second end and a curling tail 3 attached to and extending from the second end of the elongate body. The curling tail is secured to the second end of the elongate body. The curling tail has a first surface and a second surface and curves generally in a semi-circle from the first surface to the second surface and tapers at the end of the second surface. The curling tail has a width or diameter w. The first surface of the curling tail also has a height h having a midpoint illustrated along the horizontal axis 4. This Figure illustrates the curling tail trailing downward from the first surface. The second end of the elongate body has a height H. The curling tail is attached to the second end of the elongate body. The curling tail can be attached along any point of the second end of the elongate body. This figure illustrates the curling tail attached on the lower end of the elongate body. The elongate body also includes a feather 5 attached at a predetermined position on the elongate body. The attachment point can be anywhere above the midpoint of the height (h) of the first surface of the curling tail. More specifically, the feather can be positioned on the second end of the elongate body, above the midpoint at 50 percent to 150 percent of the midpoint height (h) of the curling tail. This is between 0 mm to 15 mm above the midpoint height (h) of the first surface of the curling tail. Placement of the feather outside this range does not produce the desired side to side motion (tail beating motion) of the feather.

The feather also has a total length L that extends beyond the curling tail a certain amount relative to the width (w) or diameter of the curling tail. The feather length (L) extends generally along the horizontal axis along the first surface of the curling tail. Specifically, the feather length can extend between 25 percent to 150 percent of the width (w) of the first surface of the curling tail. The feather length can extend between 10 mm to 45 mm along the first surface of the curling tail. In this figure the feather L extends about 90 percent of the first surface of the curling tail. In addition, the feather is placed above the midpoint about 110 percent of the midpoint height (h), on the second end of the elongate body. Placement of the trailing feather in the predetermined position of the lure creates the desired action of the tail as the lure moves through the water. The feather placement creates realistic looking optical side to side and back and forth swimming motion so that the lure appears more like a real fish moving through the water. The predetermined placement allows the curling tail that spirals in a corkscrew motion through the water, to generate a zone of water disturbance that creates the desired side to side feather motion. The curling tail can also be transparent so that when the curling tail moves through the water in a corkscrew fashion, the feather moves in a way that visually attracts fish as the focus is on the feature rather than the curling tail.

Figure 2:
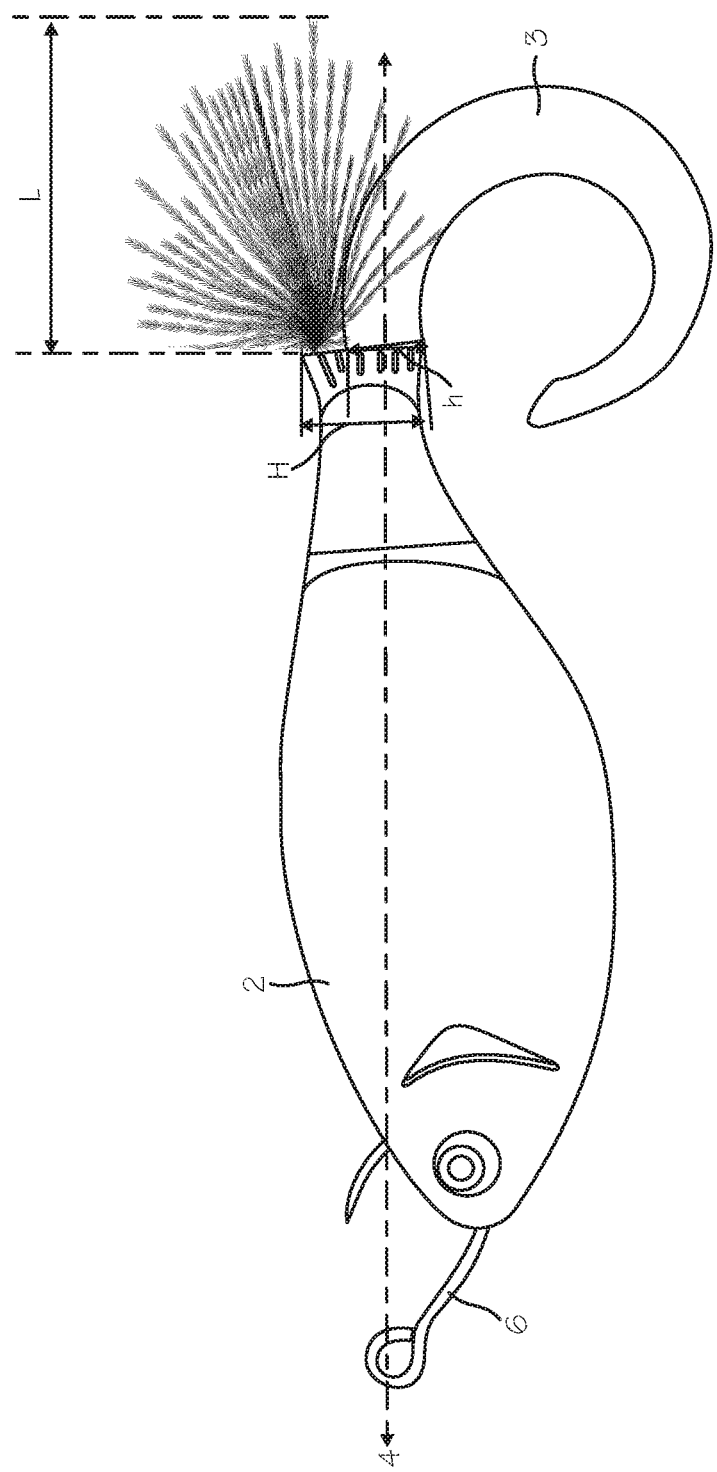
FIG. 2 illustrates an artificial fishing lure with a downward curling tail having a feather placed on another position of the elongate body.

FIG. 2 illustrates an artificial fishing lure with a downward curling tail having a feather placed on another position of the elongate body. In this figure the predetermined placement of the trailing feather is above the midpoint of the curling tail height (h) at about 125 percent of the midpoint height (h) of the curling tail. In addition, the feather length (L) extends about 125 percent of the width (w) of the first surface of the curling tail.

Figure 3:
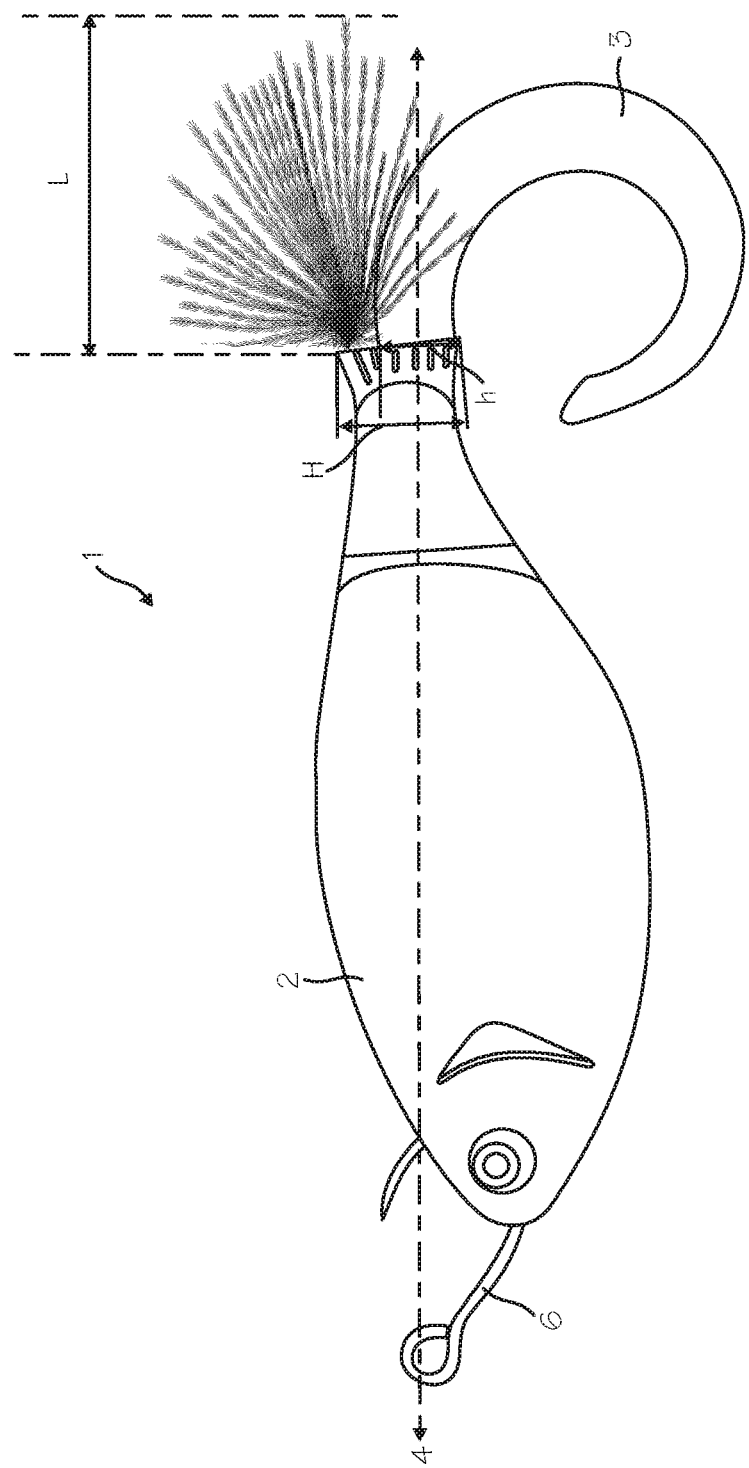
FIG. 3 illustrates an artificial fishing lure with a downward curling tail having a feather placed on another position of the elongate body.

FIG. 3 illustrates an artificial fishing lure with a downward curling tail having a feather placed on another position of the elongate body. In this figure the predetermined placement of the trailing feather is above the midpoint height of the curling tail height (h) at about 150 percent of the curling tail height. In addition, the feather length (L) extends about 125 of the width (w) of the first surface of the curling tail.

Figure 4:
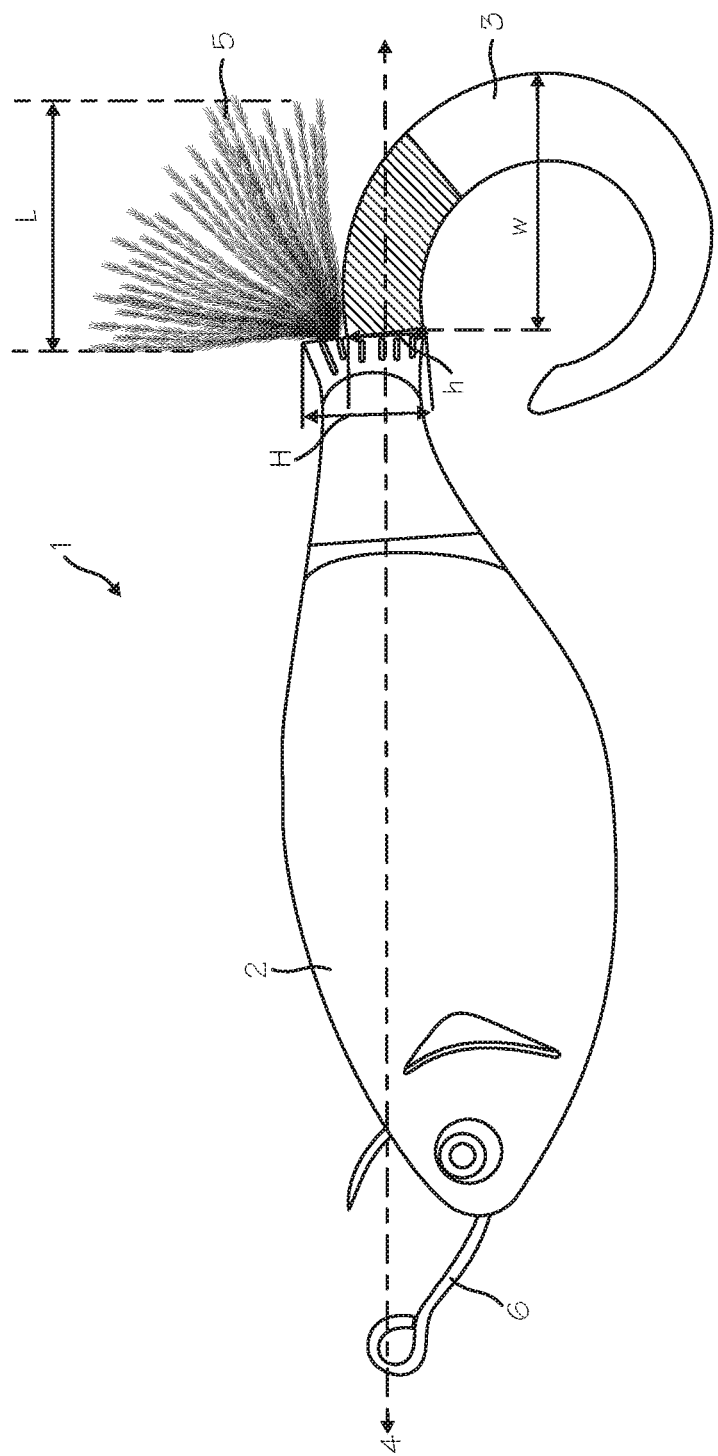
FIG. 4 illustrates an artificial fishing lure with a curling tail having a portion of the outside ridge of the first surface of the transparent curling tail that is colored.

FIG. 4 illustrates an artificial fishing lure with a curling tail having a portion of the outside ridge of the top surface of the transparent curling tail that is colored. The colored portion is contained within the top on-third of the first surface of the curling tail. The colored portion is a dark color that facilitates in drawing attention to the tail on the elongate second body and also assists in creating the visual effect of the movement of the attached feather.

Figure 5:
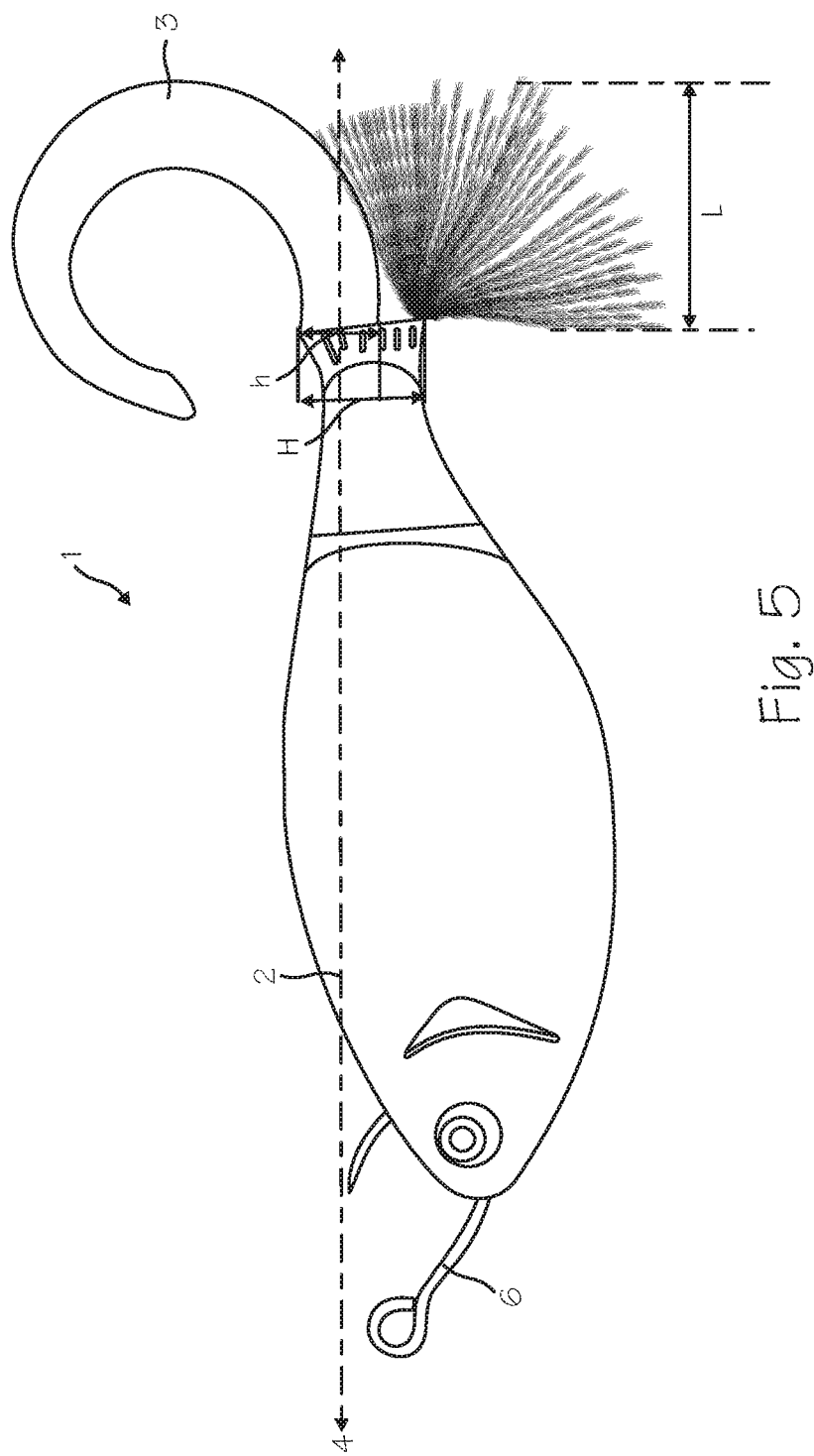
FIG. 5 illustrates an artificial fishing lure with an upward curling tail having a feather placed on a position of the elongate body.

FIG. 5 illustrates another artificial fishing lure with an upward curling tail having a feather placed on a position of the elongate body. The curling tail also includes a feather attached at a predetermined position on the elongate body, the feather having a total length. This Figure illustrates the feather L extends about 100 percent of the width (w) of the first surface of the curling tail. In addition, the feather is placed at about 90 percent of the height (H) below the midpoint of the second end of the elongate body since the curling tail is inverted and curls up instead of down.

The feather can be positioned above the midpoint of the height. More specifically, the feather can be positioned at the top 50 percent to 150 percent of the height, below the midpoint. In addition, the feather length extends generally along the horizontal axis beyond the first surface of the curling tail. Specifically, the feather length can extend or protrude from the first surface 25 to 150 percent beyond the first surface of the curling tail. In this figure the predetermined location of the trailing feather is below the midpoint at about 140 percent of the first surface height (h). In addition, the feather length trails about 100 percent from the first surface of the curling tail.

The artificial fishing lure can have the elongate body and the curling tail arranged in a linear configuration. The elongate body can be a unitary body or alternatively can be a multi segment body made of separate pieces.

The elongate body can be made of any material such as soft plastic or rubber. The first end of the elongate body includes a hook 6 or barb placed to hook a fish when the fish strikes the lure.

The curling tail ranges in shape from semi-circular to entirely circular. The curling tail tapers from the top surface to the bottom surface and may end in a pointed end. The curling tail arches in a circle from the top surface to the bottom surface and narrows at the end. The curling tail can be of varying sizes and colors or alternatively, the curling tail can be generally clear or transparent. Alternatively, the curling tail can have a portion of top ridge be colored.

The curling tail can be made of any soft and pliable material such as soft plastic (PVC) silicone, rubber, thermoplastic elastomer (TPE), elastomer (EPDM), plastisol or other similar materials. The material should have a low hardness value. Specifically, the material should have a Shore A hardness value of between Shore OO of 5 to Shore A of 40.

The feather can be a mini marabou, marabou quill and duck flank feature. The feather can also be a made of animal hair or synthetic material. The feather material must be soft, flexible, light, buoyant and capable of undulating when dragged through water.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. An artificial fishing lure comprising:
   an elongate body having a first end and a second end, the second end having a height including a midpoint;
   a curling tail attached to and extending from the second end of the elongate body, the curling tail having a top surface and a bottom surface and trailing downward from the top surface in a semi-circle, the curling tail having a height including a midpoint and a width; and
   a feather having a length, the feature positioned on the top surface of the elongate body;
   wherein the feather is positioned above the midpoint of the height of the curling tail, about 50 percent to 150 percent of the midpoint height of the curling tail;
   wherein the feather length extends between 25 percent to 150 percent of the width of the first surface of the curling tail.

2. The artificial fishing lure of claim 1 wherein the curling tail is transparent.

3. The artificial fishing lure of claim 1 wherein a portion of the outside ridge of the first surface of the transparent curling tail is colored.

4. The artificial fishing lure of claim 1 where in the curling tail is comprised of a material having a hardness between Shore OO of 5 to Shore A of 40.

5. The artificial fishing lure of claim 1 wherein the elongate body and the curling tail are arranged in a linear configuration and are a unitary body.

6. The artificial fishing lure of claim 1 wherein the elongate body and the curling tail are arranged in a linear configuration and are two separate pieces.

7. The artificial fishing lure of claim 1 wherein the feather is made of material selected from group consisting of mini marabou, marabou quill and duck flank and animal hair.

8. The artificial fishing lure of claim 1 wherein the curling tail is made of a material selected from the group consisting of soft plastic (PVC) silicone, rubber, thermoplastic elastomer (TPE), elastomer (EPDM) or plastisol.

9. An artificial fishing lure comprising:
   an elongate body having a first end and a second end, the second end having a height including a midpoint;
   a curling tail attached to and extending from the second end of the elongate body, the curling tail having a top surface and a bottom surface and trailing downward from the top surface in a semi-circle, the curling tail having a height including a midpoint and a width; and a feather having a length, the feature positioned on the top surface of the elongate body;

wherein the feather is positioned above the midpoint of the height of the curling tail, between 0 mm to 15 mm above the midpoint height of the curling tail;

wherein the feather length extends between 10 mm to 45 mm along the first surface of the curling tail.

10. The artificial fishing lure of claim 9 wherein the curling tail is transparent.

11. The artificial fishing lure of claim 9 wherein a portion of the outside ridge of the first surface of the transparent curling tail is colored.

12. The artificial fishing lure of claim 9 where in the curling tail is comprised of a material having a hardness between 50 to 90 Shore A.

13. The artificial fishing lure of claim 9 wherein the elongate body and the curling tail are arranged in a linear configuration and are a unitary body.

14. The artificial fishing lure of claim 9 wherein the elongate body and the curling tail are arranged in a linear configuration and are two separate pieces.

15. The artificial fishing lure of claim 9 wherein the feather is made of material selected from group consisting of mini marabou, marabou quill and duck flank and animal hair.

16. The artificial fishing lure of claim 9 wherein the curling tail is made of a material selected from the group consisting of soft plastic (PVC) silicone, rubber, thermoplastic elastomer (TPE), elastomer (EPDM) or plastisol.

\* \* \* \* \*